(12) United States Patent
Lin

(10) Patent No.: US 8,243,374 B2
(45) Date of Patent: Aug. 14, 2012

(54) OPTICAL LENS AND LENS ASSEMBLY HAVING SAME

(75) Inventor: Yu-An Lin, Taipei Hsien (TW)

(73) Assignee: Hon Hai Precision Industry Co., Ltd., Tu-Chneg, New Taipei (TW)

( * ) Notice: Subject to any disclaimer, the term of this patent is extended or adjusted under 35 U.S.C. 154(b) by 61 days.

(21) Appl. No.: 12/958,399

(22) Filed: Dec. 2, 2010

(65) Prior Publication Data
US 2012/0044588 A1 Feb. 23, 2012

(30) Foreign Application Priority Data
Aug. 19, 2010 (TW) .................................. 99127780 A

(51) Int. Cl.
*G02B 9/00* (2006.01)
*G02B 7/02* (2006.01)
(52) U.S. Cl. ........................................ 359/796; 359/811
(58) Field of Classification Search .................. 359/642, 359/796, 811
See application file for complete search history.

(56) References Cited

U.S. PATENT DOCUMENTS

| 7,724,452 | B2 * | 5/2010 | Huang ..................... 359/811 |
| 7,916,410 | B1 * | 3/2011 | Lin et al. ................. 359/819 |
| 2009/0015945 | A1 * | 1/2009 | Chen ..................... 359/819 |

* cited by examiner

*Primary Examiner* — David N Spector
(74) *Attorney, Agent, or Firm* — Altis Law Group, Inc.

(57) ABSTRACT

An optical lens includes a central optical portion and a peripheral portion surrounding the optical portion. The peripheral portion includes a first step surface, a second step surface, and a first connecting surface interconnecting the first step surface and the second step surface. The first step surface is adjacent to the optical portion. The second step surface has a circular groove formed therein, and the circular groove is adjacent to the first connecting surface. A lens assembly including the optical lens is also provided.

12 Claims, 5 Drawing Sheets

OPTICAL LENS AND LENS ASSEMBLY HAVING SAME

BACKGROUND

1. Technical Field

The present disclosure relates to optical lenses and lens assemblies having the same.

2. Description of Related Art

Lenses are key members of cameras. Usually, several lenses constitute a lens assembly. In order to avoid misalignment of the lenses, engaging structures, such as slanted surfaces (see section A in FIG. 3) are formed on the lenses. By cooperation of the engaging structures, two adjacent lenses can align with each other.

Referring also to FIG. 4, the section A of one lens 200 is formed by a mold 100 which has the opposite engaging structure. In actual production, the mold 100 is easily damaged (see hole 110 in FIG. 4) around edges of the engaging structure, which results in defects, such as the raw edge 210 on the lens 200. Referring to FIG. 5, the lens 200 with the raw edge is hard to match with another lens 220 which is perfectly made.

What is needed, therefore, is an optical lens and a lens assembly which can overcome the above shortcomings.

BRIEF DESCRIPTION OF THE DRAWINGS

Many aspects of the present optical lens and lens assembly can be better understood with reference to the following drawings. The components in the drawings are not necessarily drawn to scale, the emphasis instead being placed upon clearly illustrating the principles of the present optical lens and lens assembly. Moreover, in the drawings, like reference numerals designate corresponding parts throughout the several views.

DETAILED DESCRIPTION

Embodiments of the present optical lens and lens assembly will now be described in detail below and with reference to the drawings.

Figure 1:
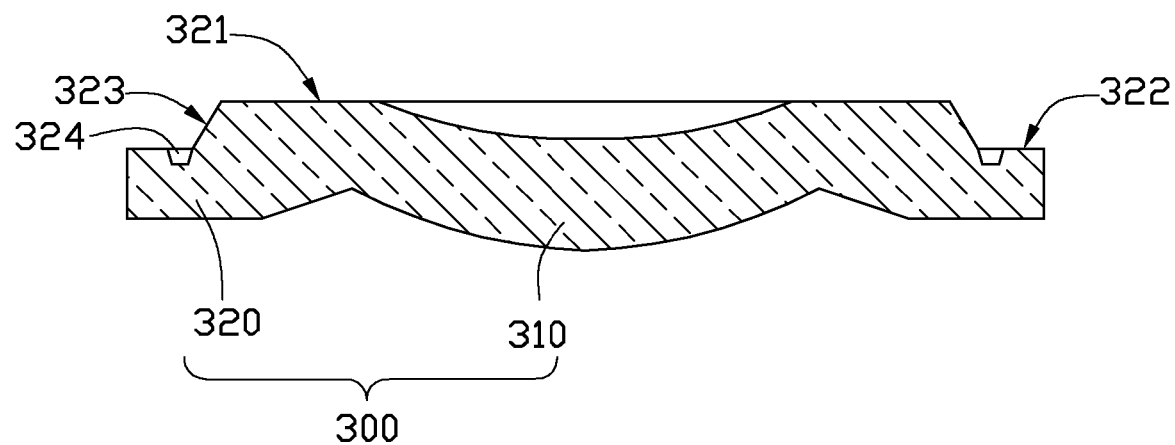
FIG. 1 is a schematic view of an optical lens in accordance with one embodiment.

Referring to FIG. 1, an optical lens 300, in accordance with one embodiment, is provided. The optical lens 300 includes a central optical portion 310 and a peripheral portion 320 surrounding the optical portion 310. The optical portion 310 is made of a light-transmissible material, i.e., an optical material. The peripheral portion 320 can be made of a non-optical material. In the present embodiment, both the optical portion 310 and the peripheral portion 320 are made of optical material.

The optical portion 310 has a curved optical surface. The peripheral portion 320 is in a step shape, and includes a first step surface 321, a second step surface 322, and a connecting surface 323 interconnecting the first step surface 321 and the second step surface 322.

The first step surface 321 is adjacent to the optical portion 310. In the present embodiment, the first step surface 321 is substantially parallel with the second step surface 322. The first step surface 321 and the second step surface 322 are flat surfaces. In other embodiments, the first step surface 321 may not be parallel with the second step surface 322.

In the present embodiment, the connecting surface 323 is slanted relative to both the first and second step surfaces 321, 322. In other embodiments, the connecting surface 323 may be perpendicular to one of or both of the first and second step surfaces 321, 322.

The second step surface 322 has a circular groove 324 formed therein, and the circular groove 324 is adjacent to the connecting surface 323.

Figure 2:
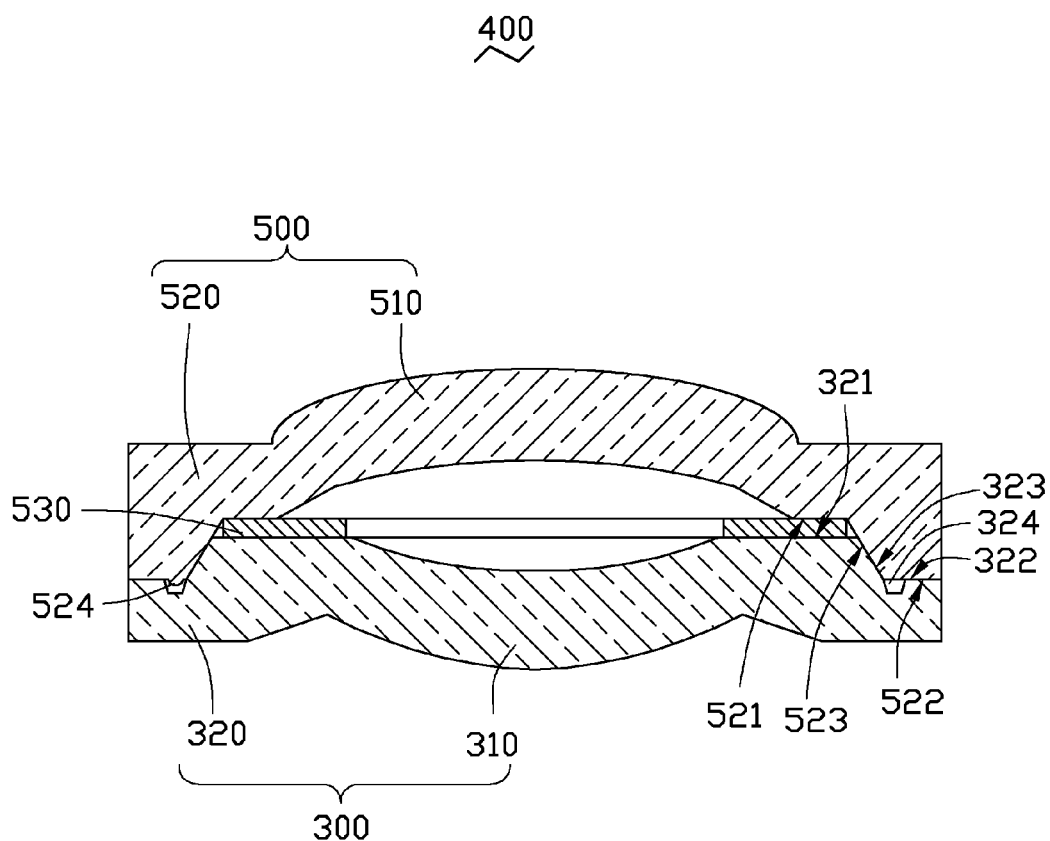
FIG. 2 is a schematic view of a lens assembly in accordance with one embodiment.
Figure 3:
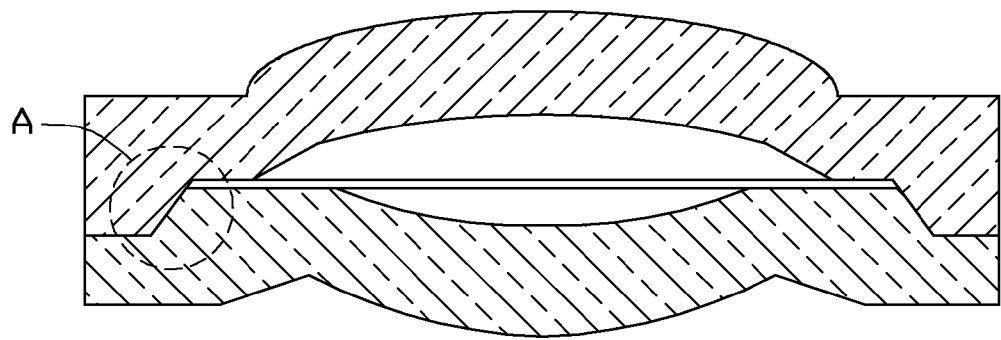
FIG. 3 is a schematic view of a conventional lens assembly.
Figure 4:
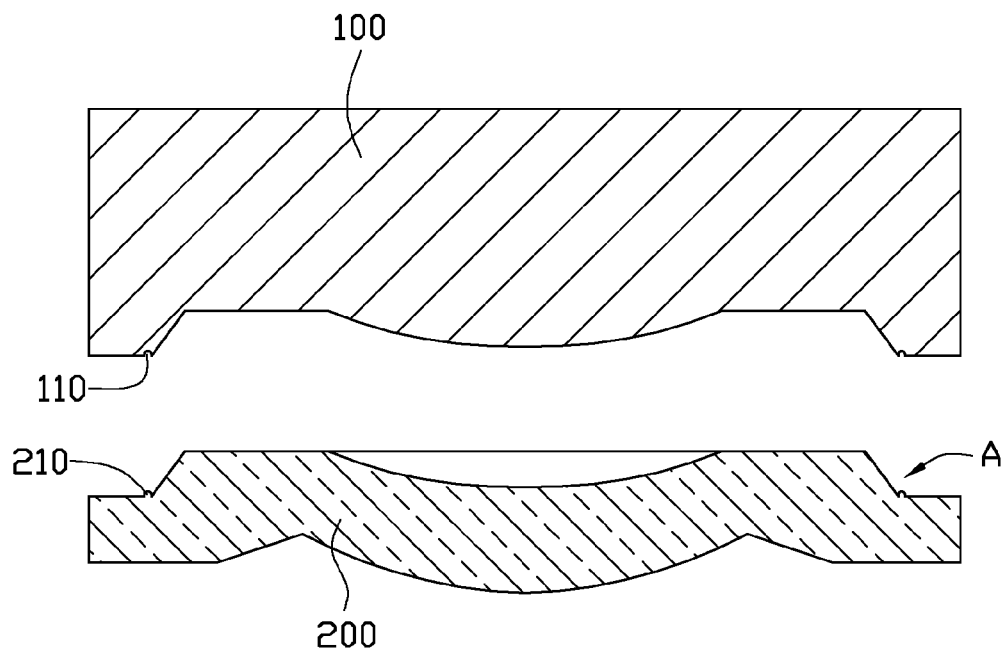
FIG. 4 shows a mold and a conventional optical lens made using the mold.
Figure 5:
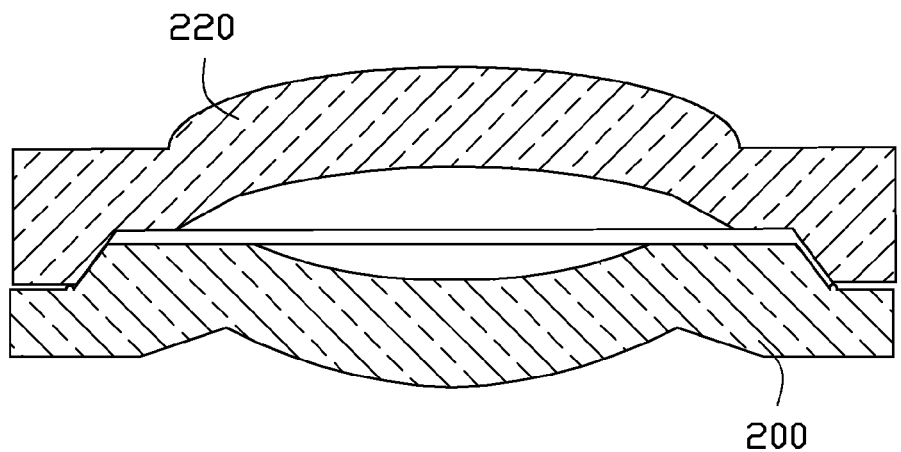
FIG. 5 shows a conventional lens assembly including the conventional optical lens shown in FIG. 4.

Referring to FIG. 2, a lens assembly 400, in accordance with one embodiment, is provided. The lens assembly 400 includes the optical lens 300 and a second optical lens 500.

The second optical lens 500 also includes a central optical portion 510 and a peripheral portion 520 surrounding the optical portion 510. The peripheral portion 520 is also in a step shape.

The peripheral portion 520 includes a third step surface 521, a fourth step surface 522, and a connecting surface 523 interconnecting the third step surface 521 and the fourth step surface 522. In the present embodiment, the third step surface 521 is parallel with the fourth step surface 522, and the third and fourth step surfaces 521, 522 are flat surfaces.

The third step surface 521 opposes the first step surface 321 of the optical lens 300. In the present embodiment, a spacer 530 is sandwiched between the first step surface 321 and the third step surface 521. The connecting surface 523 is engaged with the connecting surface 323, and the fourth step surface 522 is engaged with the second step surface 322.

The circular groove 324 of the second step surface 322, allows there can be raw edges 524 on the fourth step surface 522 without interfering with assembly and alignment. That is, the optical lens 300 allows greater tolerance for defects in the second optical lens 500.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An optical lens, comprising:
    a central optical portion and a peripheral portion surrounding the optical portion, the peripheral portion comprising a first step surface, a second step surface and a first connecting surface interconnecting the first step surface and the second step surface, the first step surface being adjacent to the optical portion, the second step surface having a circular groove defined therein, and the circular groove being adjacent to the first connecting surface.

2. The optical lens of claim 1, wherein the first connecting surface is slanted relative to both of the first step surface and the second step surface.

3. The optical lens of claim 2, wherein the first step surface is parallel with the second step surface.

4. The optical lens of claim 2, wherein the first step surface and the second step surface are flat surfaces.

5. A lens assembly, comprising:
    a first optical lens comprising a first central optical portion and a first peripheral portion surrounding the optical portion, the first peripheral portion comprising a first step surface, a second step surface and a first connecting surface interconnecting the first step surface and the second step surface, the first step surface being adjacent to the optical portion, the second step surface having a circular groove defined therein, and the circular groove being adjacent to the first connecting surface; and a second optical lens comprising a second central optical portion and a second peripheral portion surrounding the optical portion, the second peripheral portion comprising a third step surface, a fourth step surface and a second connecting surface interconnecting the third step surface and the fourth step surface, the second step surface engaged with the fourth step surface, and the first connecting surface engaged with the second connecting surface.

6. The lens assembly of claim 5, wherein the first connecting surface is slanted relative to both of the first step surface and the second step surface, and the second connecting surface is slanted relative to both of the third step surface and the fourth step surface.

7. The lens assembly of claim 5, wherein the first step surface is parallel with the second step surface, and the third step surface is parallel with the fourth step surface.

8. The lens assembly of claim 5, wherein the first step surface faces the third step surface.

9. The lens assembly of claim 8, further comprising a spacer sandwiched between the first step surface and the third step surface.

10. The lens assembly of claim 5, wherein the first step surface, the second step surface, the third step surface and the fourth step surface are flat surfaces.

11. The lens assembly of claim 10, wherein the fourth step surface has a raw edge formed thereon, and the circular groove receives the raw edge therein.

12. An optical lens, comprising:

a central optical portion and a peripheral portion surrounding the optical portion, the peripheral portion comprising a first circular surface, a second circular surface surrounding the first surface and a connecting surface obliquely interconnected between the first surface and the second surface, the peripheral portion defining a circular groove between the first surface and the connecting surface.

* * * * *